Dec. 4, 1928.

W. H. D'ARDENNE 1,693,643

MACHINE FOR MAKING AUTOMOBILE DOORS

Filed Aug. 27, 1921    8 Sheets-Sheet 2

WITNESS:
Walter M. Trout

INVENTOR.
WALTER H. D'ARDENNE
BY C. B. Desjardins
ATTORNEY.

Dec. 4, 1928.

W. H. D'ARDENNE 1,693,643

MACHINE FOR MAKING AUTOMOBILE DOORS

Filed Aug. 27, 1921     8 Sheets-Sheet 3

WITNESS:

INVENTOR.
WALTER H. D'ARDENNE
BY
ATTORNEY.

Dec. 4, 1928.

W. H. D'ARDENNE 1,693,643

MACHINE FOR MAKING AUTOMOBILE DOORS

Filed Aug. 27, 1921    8 Sheets-Sheet 4

WITNESS:
Walter M. Sprout

INVENTOR.
WALTER H. D'ARDENNE
BY C. B. Desjardins
ATTORNEY.

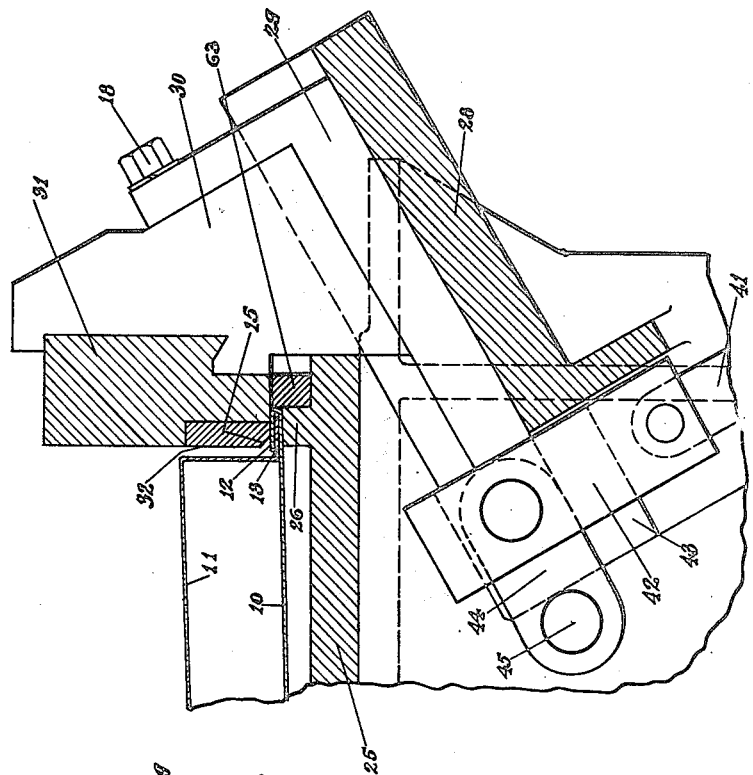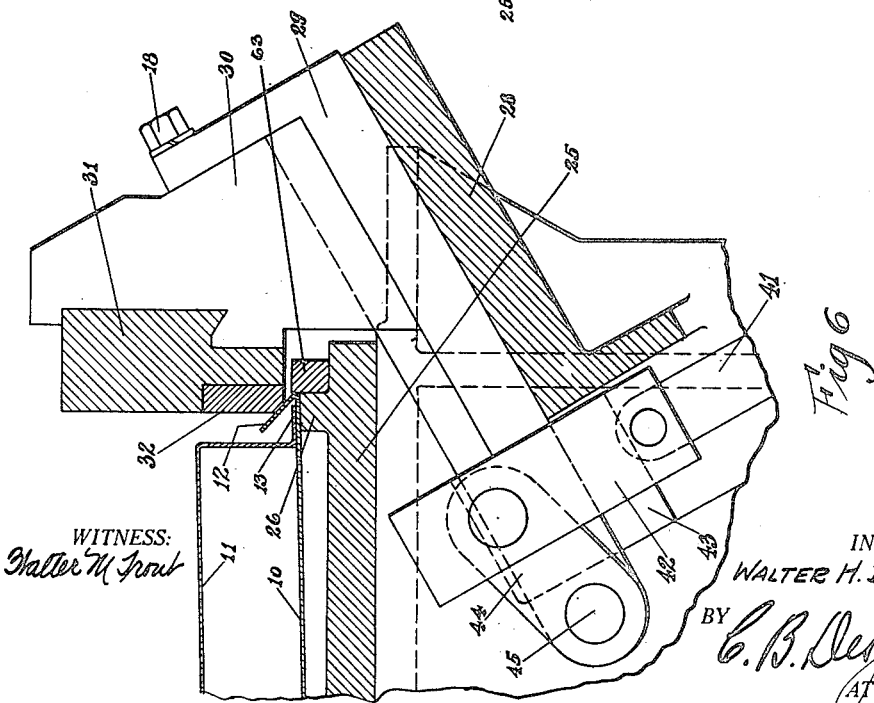

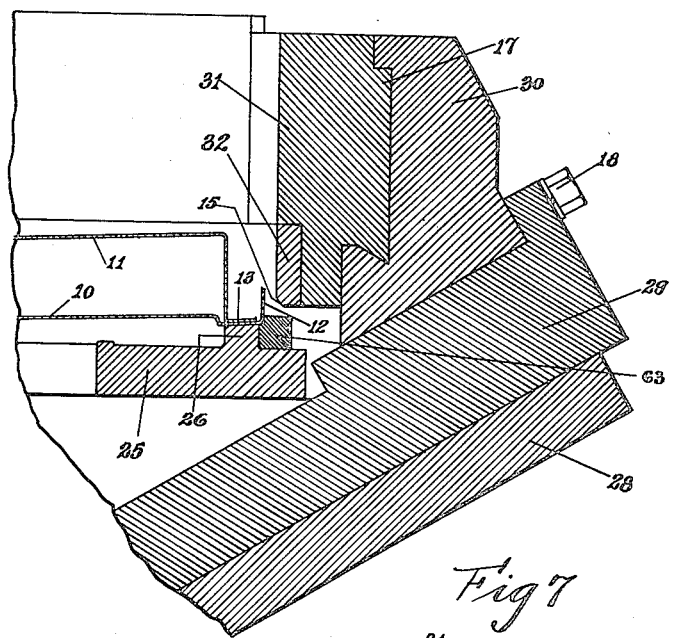
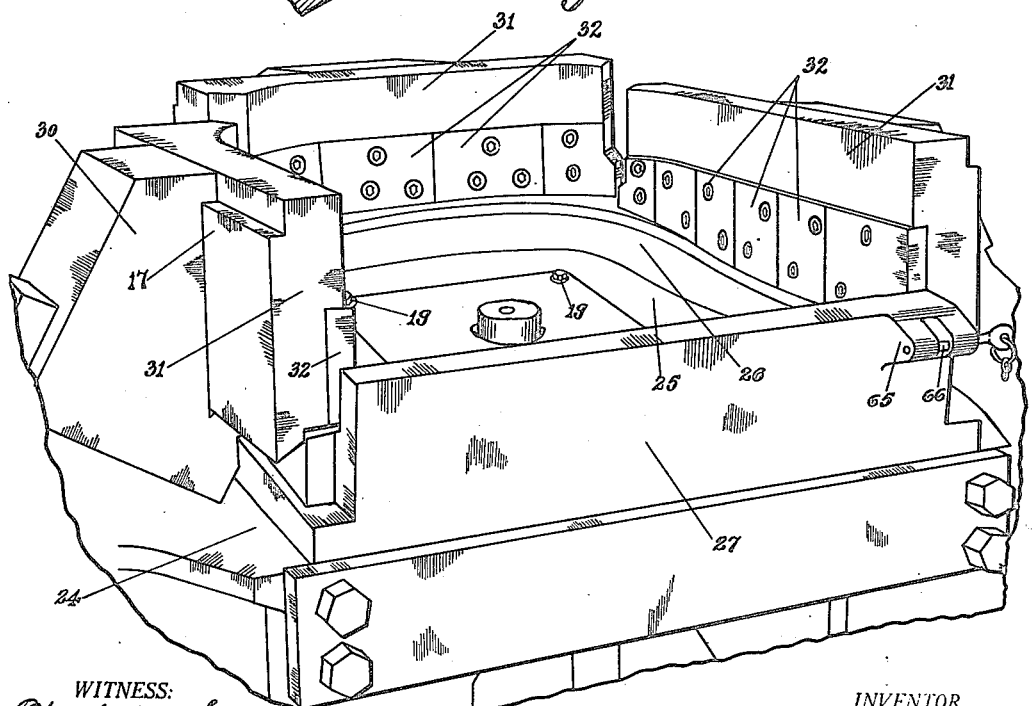

Dec. 4, 1928.

W. H. D'ARDENNE 1,693,643

MACHINE FOR MAKING AUTOMOBILE DOORS

Filed Aug. 27, 1921   8 Sheets-Sheet 8

Witness
Walter M. Trout

INVENTOR.
WALTER H. D'ARDENNE.
BY
C. B. DesJardins
ATTORNEY.

Patented Dec. 4, 1928.

1,693,643

UNITED STATES PATENT OFFICE.

WALTER H. D'ARDENNE, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

MACHINE FOR MAKING AUTOMOBILE DOORS.

Application filed August 27, 1921. Serial No. 496,067.

This invention relates to a new and improved machine for making automobile doors.

Metallic automobile doors are usually constructed of two sheet steel panels with their body portions offset from each other, so as to form a chamber between the two panels. The edge portions of the two panels are in engagement with each other and connected together by clinching the edge portion of one panel over the edge flange of the other. Heretofore, the assembling of such automobile doors has required two separate operations. The inner, offset panel is, first, laid upon the outer panel, with its edge portion resting on the outer panel, and the flange of the outer panel, which is to be clinched over the edge of the inner panel, is then bent down until it lies at an angle of substantially forty-five degrees to the plane of the outer panel. The door, which is partly assembled as described, is then placed in a press which operates to complete the clinching of the flange of the outer panel over the edge of the inner panel.

The principal object of my invention is to provide a machine in which the assembling of automobile doors may be effected at a single operation or stroke of the machine.

Another object of my invention is to provide a machine for making automobile doors, having a bed, on which the door rests, and a plurality of die members moving toward said bed along lines at an acute angle to the plane of said bed.

Another object of my invention is to provide a machine for making sheet metal automobile doors having a bed on which the door may rest with a panel flange extending substantially perpendicular thereto, and a die member moving toward said bed at such an angle as to strike the side of said perpendicular flange and move it through substantially ninety degrees clinching it upon the edge of the other panel.

Further objects, and objects relating to details and economies of operation and construction, will definitely appear from the detailed description to follow. My invention is clearly defined and pointed out in the appended claims. A machine constituting a preferred embodiment of my invention is illustrated in the accompanying drawings, forming a part of this specification, in which:

Fig. 5 is an enlarged, fragmentary, sectional view, corresponding to a part of Fig. 3 and showing one of the die members in final position at the completion of the flange clinching operation.

Fig. 6 is a similar view showing the position of the die member at an intermediate stage in its stroke.

Fig. 7 is a similar view showing the position of the die member at the outer point of the stroke, before it has started to move toward the bed on which the door to be assembled rests.

Fig. 8 is a perspective view of the head of the machine showing the bed on which the door panels rest and the movable die members for clinching over the flange.

In the drawings, the same reference numerals refer to similar parts throughout the several views and the sectional views are taken looking in the direction of the arrows at the ends of the section lines.

Figure 1:
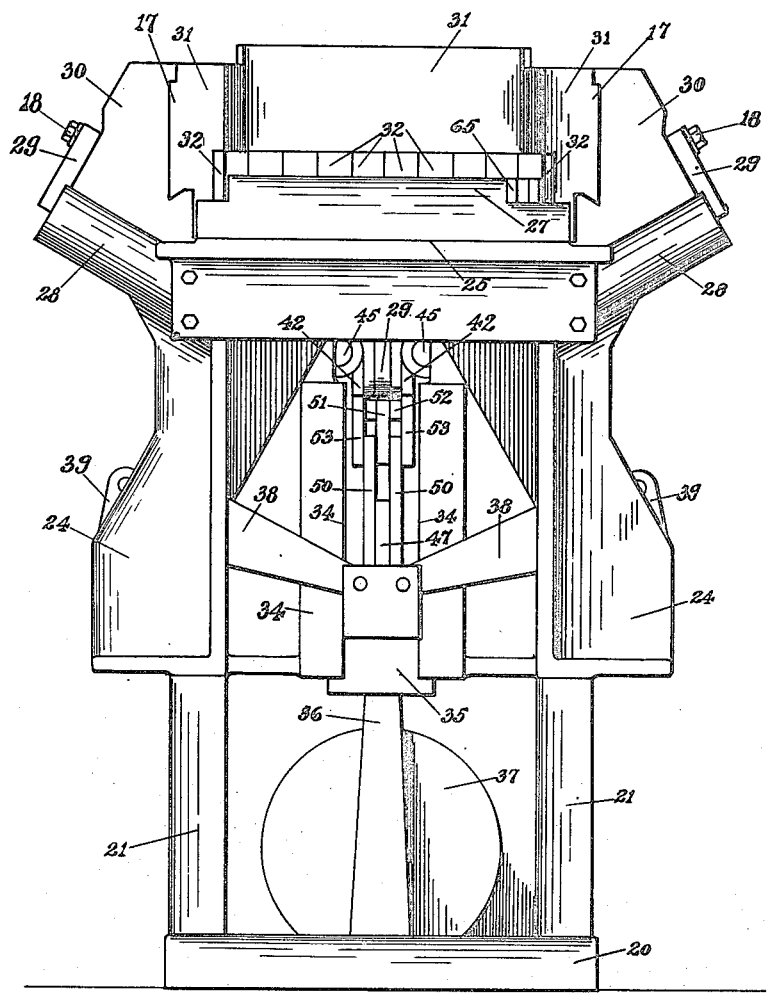
Fig. 1 is a view in front elevation of a machine embodying my invention.
Figure 2:
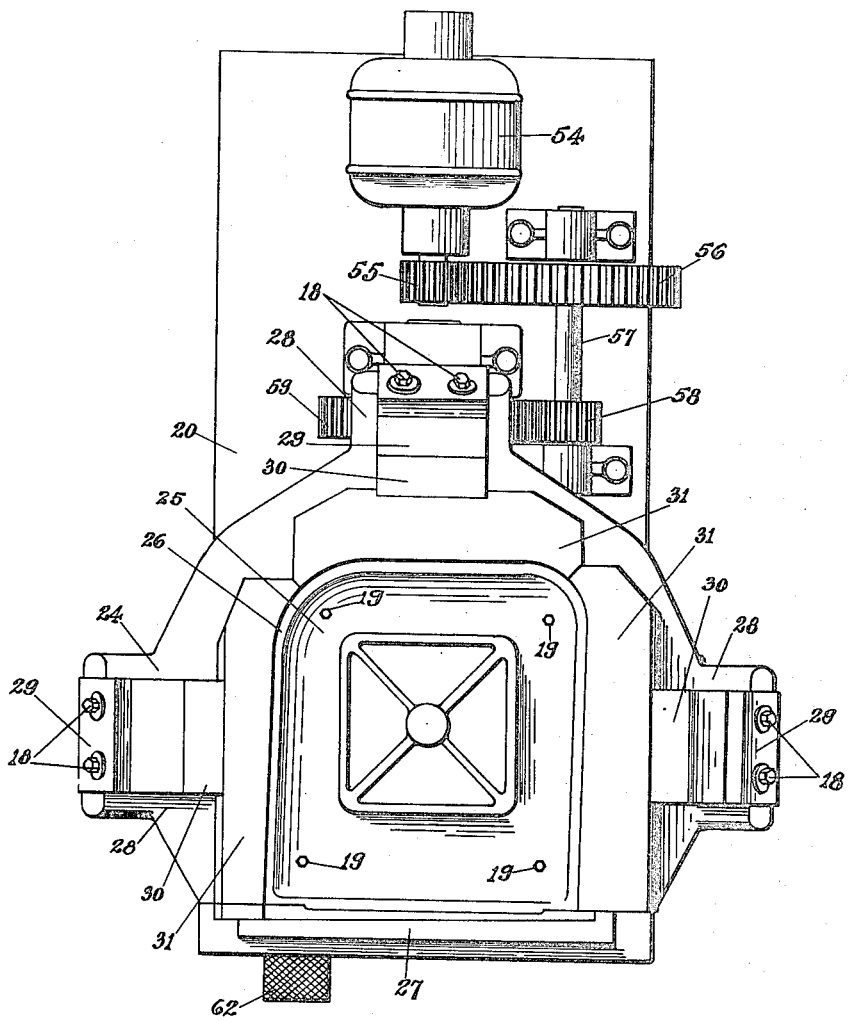
Fig. 2 is a top plan view of the machine.
Figure 3:
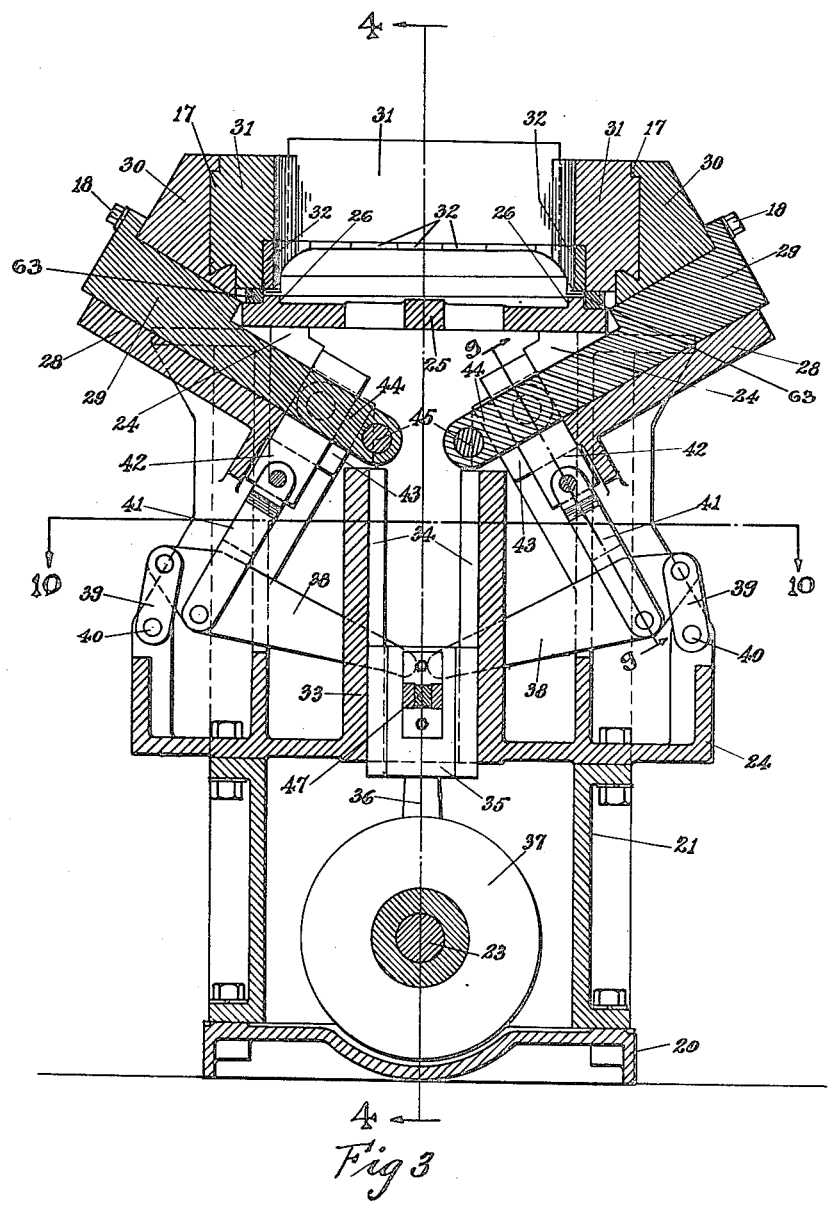
Fig. 3 is a vertical, sectional view taken on the line 3—3 of Fig. 4.

I attain the objects of my invention and carry my invention into effect, in general, by providing a machine which includes a bed or table upon which the door panels, to be assembled and connected to form the door, are placed. I also provide a series of movable die members surrounding this table or bed and so mounted and guided that they move toward the bed at acute angles to the plane of the bed. The door panels are positioned on the bed so that the flange, which is to be clinched over to connect the panels, extends substantially perpendicular to the plane of the bed, and these movable die members are so guided in their movement that, as they move toward the bed, they strike the side of said flange and swing it or move it through an angle of about ninety degrees, finally pressing it upon the flange of the other panel in a position substantially parallel to the plane of the bed. The working faces of these die members may be suitably fashioned and formed to effect this action upon the flange, and the bed may also be formed so as to form a fixed member coacting with the movable die members and engaging the panels adjacent the edge flange. My machine may also comprise a motor and suitable connections between said motor and the movable die members, causing said die members to move simultaneously toward and from the bed of the machine. In order to hold the panels rigidly and firmly on the bed during the operation of these die members, I may provide electro-magnetic means, such as an electro-magnetic chuck, which will grip these panels and hold them to the bed.

The machine, which is illustrated in the accompanying drawing, is one specific embodiment of my invention and may be changed considerably within the scope of my invention. This specific embodiment of my invention is designed for the assembling of metallic doors for automobiles made by connecting the outer panel, 10, and the inner panel, 11. The outer panel, 10, as shown in Fig. 7, has a flange, 12, which, when these panels are inserted in the machine, extends perpendicularly to the plane of the panel, 10. The body portion of the inner panel, 11, is offset from the plane of its edge portion, 13, which rests upon the portions of the panel, 10, adjacent the base of the flange, 12. This machine, at a single stroke, forces the flange, 12, from the position shown in Fig. 7 to that shown in Fig. 5, thus clinching said flange over the edge, 13, of the inner panel, 11, and assembling and connecting the door panels to form the completed door. Whenever, in this specification, I refer to the plane of the door panel or the bed of the machine, it is to be understood that I use the term in a broad or general sense, since, as a matter of fact, neither the door panels nor the bed of the machine lie in a single plane, being curved to conform to the contour of the automobile body.

The machine comprises a base, 20, having the side walls, 21, the rear side wall being provided with a boss, 22, in which a drive shaft, 23, is journaled. The head, 24, is mounted on the upper ends of these side walls, 21, and, at the upper end of this head there is a bed or table, 25, which has a ledge, 26, running continuously around the two sides and rear margin of said bed. At the forward margin of this bed there is the shoulder, 27. This ledge, 26, is curved to conform to the door panels and supports the edges of the door panels, constituting a fixed die member with which the movable die members coact in clinching the door panel flange to make the door. The shoulder, 27, constitutes a stop which the top rail of the door engages during this clinching operation. The head, 24, of the machine is provided with a series of guide-ways, 28, in this case, three, which are inclined at an acute angle to the plane of the bed, 25. The slide members, 29, are mounted in said guide-ways, 28, so that they are reciprocable therein and each of these slide members, 29, has a die holder, 30, detachably mounted thereon and secured thereto by the bolts, 18. Each of the die holders, 30, carries a removable die block 31, the die holder, 30, and the die block, 31, being connected by the dove-tail, 17, and the bolts, 16. In this machine there are three of these die blocks, 31, one opposite each of the sides of the door and a third member opposite the bottom of the door. A series of hardened steel plates, 32, are detachably connected to the die blocks, 31, and constitute the die faces, being the parts of the dies which actually engage the door panel flange to clinch it over. These plates, 32, constituting the die face, have a belevel edge, 15, so as to increase the surface in contact with the flange as it is being forced to its clinched position.

The bed, 25, with its ledge, 26, which we have previously described, constitutes a stationary die member with which these movable die members, 31, cooperate. A hardened steel gauge strip, 63, which is curved to conform to the contour of the door, is positioned just outside the ledge, 26, and projects slightly above it. This strip positions the outer panel correctly on the bed, 25. The cooperating surfaces of the bed, 25, and the die members, 31, are curved so that they conform to the contour of the door panels which are to be assembled by them, and, in order to permit the use of this machine in assembling doors of different design, the bed, 25, is made removable, being detachably secured to the head, 24, of the machine, by the bolts, 19. The die blocks, 31, are likewise removable since they are connected to the die holders by the bolts, 16, and the dove-tail, 17, and the die holders, 30, are detachably connected to the slide members, 29, by the bolts, 18. This permits the removal of the die blocks, 31 and the bed, 25, and the substitution of another bed and other die members curved to conform to doors of a different contour.

Figure 11:
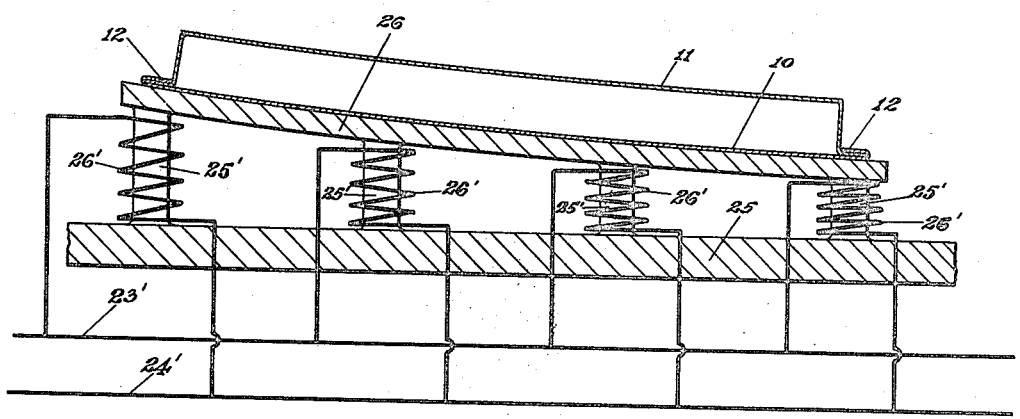
Fig. 11 is a diagrammatic view of electromagnetic means for holding the outer panel rigidly on the bed.

I have found it desirable that some means be provided for clamping the edge portions of the door panels to the ledge, 26, of the bed, 25, during the flanging or clinching action of the machine. In one instance, I accomplish this by providing suitable coils or solenoids, 26', in the bed, 25, surrounding portions of the bed which form the cores, 25', for the solenoids. The solenoids, 26', are electrically connected with the circuit leads, 23', and, 24', which are connected with a suitable source of current so that the electro-magnetic lines of force, generated when the circuit is closed, operate to clamp the door panels to the ledge, 26. I have shown this arrangement, diagrammatically, in Fig. 11, but have omitted the solenoids in the other view to avoid confusing detail.

Figure 4:
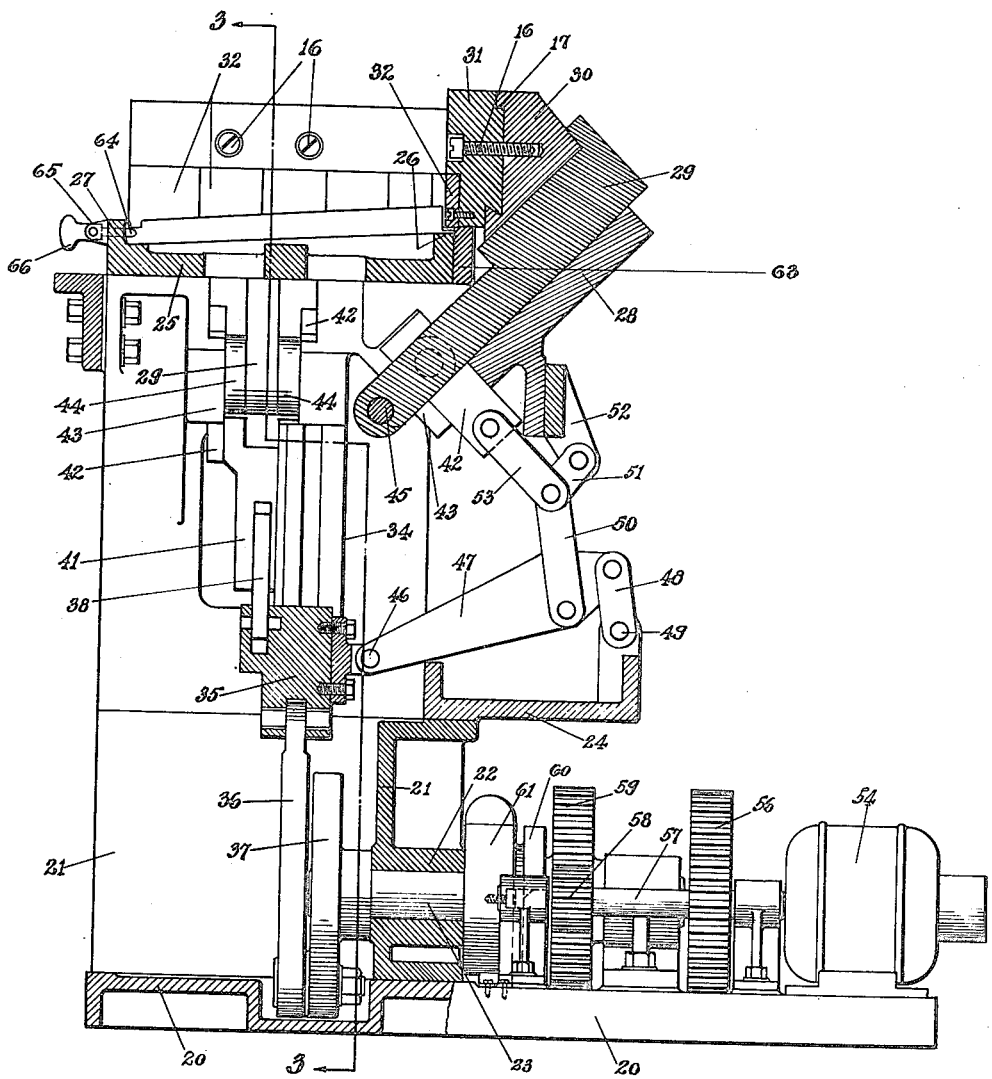
Fig. 4 is a vertical, sectional view taken substantially on the line 4—4 of Fig. 3.
Figure 9:
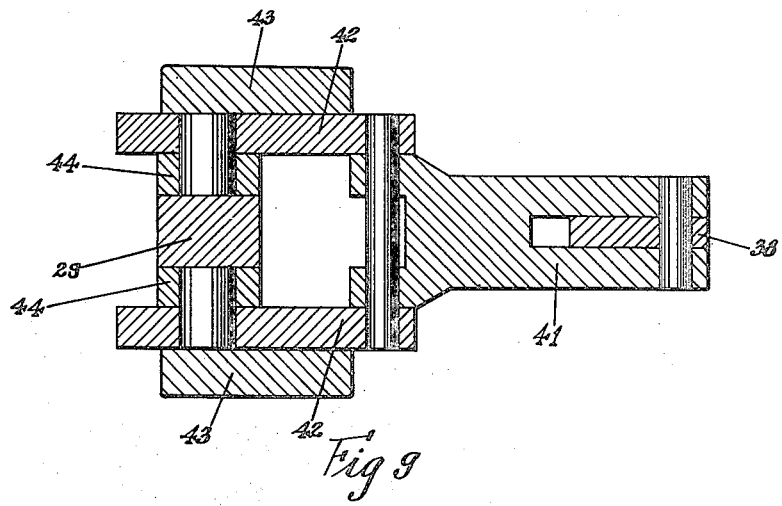
Fig. 9 is a sectional view taken on line 9—9 of Fig. 3.
Figure 10:
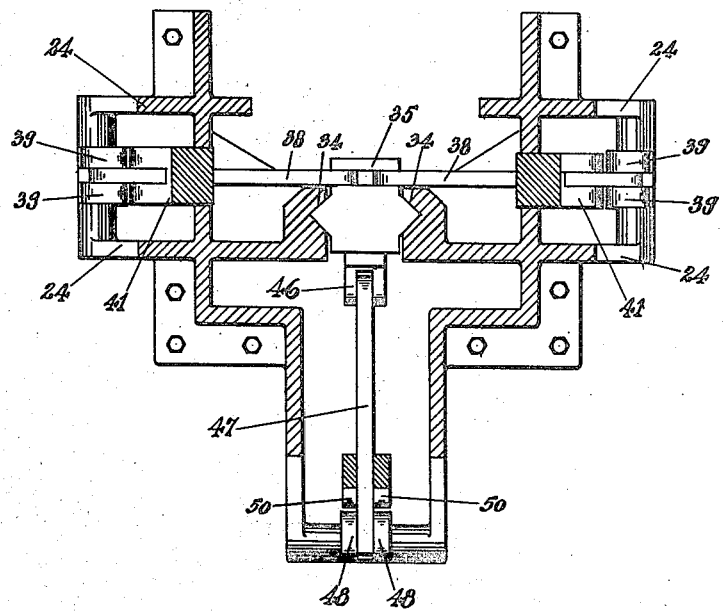
Fig. 10 is a transverse section on the line 10—10 of Fig. 3.

It will be seen that, as the slide members, 29, reciprocate on the guide-ways, 28, the working faces of the die members, 31, will move toward and recede from the bed, 25, moving, along lines at an acute angle to the plane of said bed. The simultaneous reciprocation of these slide members is provided for by linkage actuated by the drive-shaft, 23. The head, 24, of the machine is provided with the vertical guide-ways, 34, in which a block, 35, is slidably mounted. This block, 35, is connected by the connecting rod, 36, to a point at one side of the center of the fly wheel, 37, mounted on this shaft, 23, so that, as the drive shaft, 23, rotates, the block, 35, is caused to reciprocate vertically in the guide-ways, 34. The slide members, 29, at the sides of the machine, are each actuated by a linkage including a rocker link, 38, having its outer end fulcrumed on floating links, 39, which are pivotally connected, at 40, to the head, 24, of the machine. The inner end of the rocker link, 38, is pivotally connected to the vertically reciprocating block, 35. A push rod link, 41, is pivotally connected to the rocker link, 38, intermediate its ends, the push rod link having its one end forked and straddling the rocker link. The other end of the link, 41, lies between and is pivotally connected to a pair of push rods, 42, which are slidably mounted in ways, 43, formed in the head, 24, so that these push rods move at right angles to the course of the slide member, 29. The inner end of the slide member, 29, is narrower than its body portion and is disposed between the push rods, 42, as clearly shown in Figs. 4 and 9 of the drawing. The push rods, 42, are connected to the slide member, 29, by a pair of links, 44, pivotally connected to the push rods and to the extreme inner end of the slide member, 29. It will be seen that, as the block, 35, is reciprocated along the vertical guide-ways, 34, causing the link, 38, to rock on its fulcrum on the floating links, 39, the push rods, 42, will be reciprocated on their guide-ways and, due to the links, 44, connecting them with the inner end of the slide member, 29, the said slide member will be caused to reciprocate on the guide-way, 28, in a direction at right angles to that of the push rods, 42.

The slide member, 29, at the rear of the machine, carrying the die member which cooperates with the bottom edge of the door, is reciprocated in a similar manner by means of push rods, 42, and links, 44. The linkage which causes the reciprocation of the push rods, 42, is slightly different, in this case, comprising the rocker link, 47, pivotally connected, at 46, to the block, 35, and having its rear end fulcrumed on the floating links, 48, which are pivotally connected to the frame, 24, at 49. The rocker link, 47, is connected by means of the links, 50, to the push-rod connecting links, 53, which are also connected to a bracket, 52, on the frame, 24, by means of the short idler links, 51. The push-rod connecting links, 53, are connected to the push-rods, 42, as in the linkage previously described. It will be seen that, as the block, 35, reciprocates vertically, causing the rocker links to rock on their fulcrums, the push rods, 42, will be caused to reciprocate in a direction transverse or at right angles to the slide members, as has been described above.

In order to drive the shaft, 23, I provide an electric motor, 54, mounted on the base, 20, and having a pinion, 55, on its armature shaft. This pinion, 55, meshes with the gear, 56, on the idler shaft, 57, and the latter shaft carries a pinion, 58, meshing with a gear, 59, which is journaled in suitable bearings on the base of the frame. A clutch mechanism, 60, is provided for connecting the gear, 59, with the drive shaft, 23. Said clutch mechanism is so arranged that, when it is actuated by depressing the operating pedal, 62, the driven gear, 59, is connected with the drive shaft, 23, so as to drive it and, when the operator takes his foot from the pedal, the drive shaft will be disconnected at a certain point in its revolution, so that the machine will be stopped with the die members in their outer position, permitting the removal of the finished door and the positioning of new work on the bed, 25. A spring brake, 61, acts on the drive-shaft adjacent the clutch, 60, so as to bring it to a stop as soon as the driving gear is thrown out of driving engagement with it.

The foregoing description of the operating parts of this machine, will make its operation very clear. The door panels are first positioned on the bed, 25, of the machine, as shown partially in the fragmentary view, Fig. 7, with the outer face of the outer panel, 10, resting on the ledge, 26, of the bed, 25, and the flange, 12, around the margin of this panel extending substantially at right angles to the plane of the panel and of the bed, 25. The inner panel, 11, is positioned on the outer panel, 10, with the edge portion, 13, resting thereon adjacent the base of the flange, 12. The top rail of the door rests against the shoulder, 27, at the front edge of the bed, 25. Usually there is a curtain rod socket in the top rail of the door and, in such cases, I provide a hole through the shoulder, 27, through which a pin, 64, may be inserted into the curtain rod socket so as to hold the door panels in position during the clinching operation. As shown, the hole is located between the ears, 65, and, after the pin, 64, has been inserted, a keeper pin, 66, may be inserted transversely of said ears to prevent the accidental removal of the pin, 64. In Fig. 7, the die members, 31, are shown in their outer position. After the door panels have been placed on the bed of the machine, as described, the operator throws the driven gear, 59, into engagement with the drive shaft, 23, through the clutch, 60, and this drive shaft makes one complete revolution causing the reciprocation of the block, 35, from its upper position to its lower position and back again to its upper position. This causes the reciprocation of the several slide members, 29, carrying the die holders, 30, and the die members, 31. As shown in Fig. 7, the slide member, 29, is in its outer position and the beveled faces, 15, of the plates, 32, engage the flange, 12, of the outer panel and force it over as the slide member, 29, moves inwardly, to the position shown in Fig. 6, and, finally, to the position shown in Fig. 5, in which the flange, 12, is pressed and clinched over the edge portion, 13, of the inner panel. During this flanging or clinching operation, the door panels are clamped rigidly on the bed, 25, by the electro-magnetic chuck arranged in said bed, as previously indicated.

I am aware that the embodiment of my invention, which has been described here, may be altered considerably without departing from the spirit of my invention and, therefore, I claim my invention broadly, as indicated by the appended claims.

Having thus described my invention, what I claim as new and desire to secure by Letters Patent is:

1. A machine of the class described comprising a frame, a bed removably secured thereto and constituting a fixed die member, on which the door panels rest, and conforming to the contour of the door to be made, a plurality of removable die members movable along paths at acute angles to the plane of said bed, to clinch a flange on one of said panels over the edge of the other, said die members having working faces conforming to the contour of the edge portions of the door to be made, electro-magnetic means for holding said panels rigidly on the bed during the operation of said die members, and means for actuating said die members.

2. A machine of the class described comprising a frame, a bed carried thereby, on which the door panels rest, a plurality of guide-ways in said frame inclined at an angle to the horizontal, slide members reciprocable in said guide-ways, a plurality of die members carried by said slide members and adapted to engage the flange of the one door panel to clinch it over the edge of the other door panel, a vertically reciprocable block, a plurality or rocker links fulcrumed on said frame and pivotally connected to said block, push rods mounted to reciprocate transversely of said slide members, links connecting said push rods and the corresponding slide members, linkages connecting said push rods and said rocker links, and means for reciprocating said block.

3. A machine for folding over and crimping down a substantially right-angularly flanged edge of a metal sheet upon the adjacent edge of another sheet to be joined to the first-named sheet comprising a work-holding bed adapted to support the sheets in proper relation for joining, a folding over and crimping die movable on a path at an acute angle to the work holding bed, said die having two extended working faces at an angle to each other and lying one on either side of the path of movement of the die, the one, in the working stroke of the die, engaging the flange initially to turn it over and the other taking up the turning over of the flange in the further movement of the die and finally engaging the turned over flange parallel to the work holding bed over a relatively large area of contact to crimp it firmly and positively into engagement with the edge of the adjacent sheet.

4. A machine for turning over and crimping down a substantially right-angularly arranged edge flange of a metal sheet over the edge of an adjacent sheet comprising a work-holding bed adapted to support the sheets in proper relation to be joined, and a turning over and crimping die device movable always along a rectilinear path intersecting the plane of the completed joint and having an extensive working face arranged parallel to the plane of the edge of the sheet over which the flange is to be crimped and another working face at an angle to said first-named face adapted, in the working stroke of the die device, to initially engage and turn over said flange, said first-named surface, in the further movement of the die device, completing the turning over of the flange and finally exerting strong pressure upon the flange in a direction substantially normal to the plane of the joint and thereby firmly crimping down the flange to complete the joint.

5. A machine for folding over and crimping down an edge flange of a metal sheet arranged substantially right-angularly to the body of the sheet adjacent the flange over the edge of an adjacent sheet to be joined thereto, comprising a work holding bed adapted to support the sheets in proper relation to be joined, a folding over and crimping die device always movable in a path intersecting the completed joint and having angularly related working faces merging into each other and lying one on either side of the path of movement of the die device and adapted to engage said flange and transmit the working pressure, in the working stroke of the die, first in a direction making an angle with the path of movement of the die on one side thereof, and finally, in a direction making an angle with said path on the opposite side thereof.

6. A machine for folding over and crimping down an edge flange of a metal sheet arranged substantially at right angles to the edge of an adjacent sheet to which it is to be joined, comprising a work-holding bed adapted to support the sheets in proper relation to be joined, a folding over and crimping die device movable in a path at an angle to said work holding bed and having two extensive angularly related working faces lying on either side of said path joined by a third relatively narrow working face, said faces in each working stroke of the die device, engaging the flange successively to turn it over and finally crimp it down firmly into engagement with the edge of the adjacent sheet.

In testimony whereof, I affix my signature.

WALTER H. D'ARDENNE.